Sept. 21, 1926.                                              1,600,960
T. S. HOSE
WEDGE DEVICE
Filed August 20, 1923.

INVENTOR.
Titus S. Hose
by Parker & Rockwood
ATTORNEYS.

Patented Sept. 21, 1926.

1,600,960

UNITED STATES PATENT OFFICE.

TITUS S. HOSE, OF LITTLE FALLS, NEW YORK, ASSIGNOR TO HENRY CHENEY HAMMER CORPORATION, OF LITTLE FALLS, NEW YORK.

WEDGE DEVICE.

Application filed August 20, 1923. Serial No. 658,205.

This invention relates to improvements in wedges or wedge securing devices such as are used for the purpose of retaining the heads of tools or implements, such as hammers, axes and the like on their wooden handles.

Some devices of this sort heretofore suggested have been so formed as to necessitate their manufacture by relatively expensive methods, such, for example, as malleable casting, or so as to require additional means for preventing the loosening of the wedge; other devices are objectionable or only partially fulfill their intended purpose for the reason that they have been provided with heads or parts which will engage the heads or other parts of the tools and thus limit the distance to which they can be driven into handles, so that if the handle shrinks and loosens after the wedge has been once driven in to the intended position, the handle cannot be tightened by driving the wedge in further.

One of the objects of the present invention is to provide a practical and efficient wedge securing device of the character mentioned which is so formed that it may be readily drop forged, which is a relatively inexpensive method of manufacture. Other objects are to form a device of this sort having improved formation whereby it will firmly engage the material of the handle to prevent the device from working loose; and to improve devices of this sort in the other respects hereinafter specified.

Figure 1:
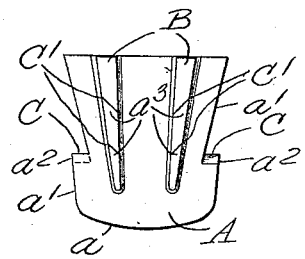
Fig. 1 is a side elevation or face view of a wedge embodying my invention.
Figure 2:
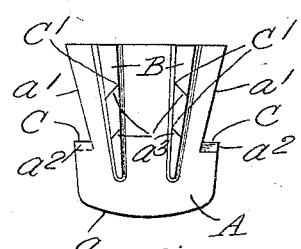
Fig. 2 is a similar view which may be either the opposite face of the wedge shown in Fig. 1 or of a wedge having an alternative arrangement of the oblique tooth faces thereof.
Figure 3:
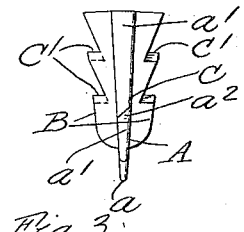
Fig. 3 is an end view of the wedge.
Figure 4:
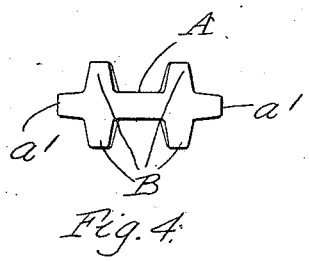
Fig. 4 is a plan view thereof.
Figure 6:
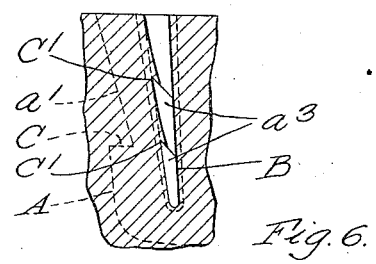
Fig. 6 is an enlarged fragmentary section showing the gripping edges formed by the oblique faces on the wedge teeth and their action in opposing outward movements of the device.
Figure 5:
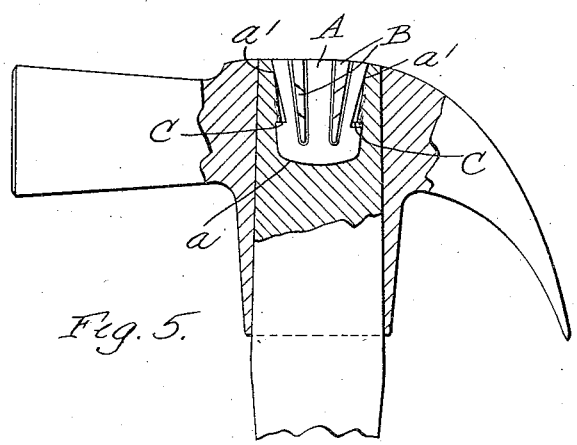
Fig. 5 is a sectional view of a hammer in which the head is secured to the handle by means of my improved wedge.

The wedge of this invention preferably comprises a wedge plate A tapered downwardly to a thin entering edge $a$ and also preferably tapered in width or formed with inclined side edges $a'$ converging downwardly towards each other, and one or more wedge-shaped ribs B on opposite sides of the plate A. The wedge plate A is provided on each of the side edges $a'$ with one or more bevelled teeth $a^2$. The teeth $a^2$ are provided with an oblique end inclined transversely of the plane of the wedge plate, as shown in Fig. 3, so as to form a sharp edge C adapted to engage the sides of the cleavage and cut into the spread fibers of the wood in a direction in which the edge has been driven, so as to oppose outward movements of the wedge after it has been driven into a handle. The ribs B are also provided with a series of wedge teeth $a^3$ formed in a similar manner to the teeth $a^2$ on the side edges of the wedge plate A and having inclined or oblique ends forming sharp upper edges C'. The wedge plate A in the preferred form disclosed in the drawings, is provided with a pair of the tapered or wedge ribs B on each face spaced as shown, and the inclined faces of the teeth $a^3$ thereof diverge or are inclined in opposite directions so that the sharp edges C' are presented to the wood in opposition to one another. They may diverge upwardly and outwardly as shown in Fig. 1, or upwardly and inwardly as in Fig. 2, and preferably two alternative arrangements are used on the opposite sides of the wedge.

The sharp edges C C' of the bevelled teeth, arranged as described, are adapted to bite into or engage the wood of the handle at the sides of the lines of cleavage caused by driving the wedge into the handle, and are, therefore, adapted to oppose any tendency of the wedge to work outwardly.

The described construction provides a wedge which may be readily driven further into the handle from time to time, should the wood shrink, and will, through the provision of the edges C C', firmly engage or bite into and cut the wood fibers at the points where these edges are positioned, so that portions of the handle will project over the edges when the wedge is in as far as required so that no loosening or outward movement of the wedging device is possible. The device may be easily and cheaply produced by drop forging in large quantities.

I claim as my invention:

1. A wedge device of the character described, comprising a wedge plate having an entering edge, opposite side edges on said plate each having a cut away portion between its ends to form a transversely inclined face having a biting edge, and outwardly projecting wedges extending from the opposite faces of said wedge plate, each of said projecting wedges having a plurality of separate wedge teeth each formed with an inclined top face and an oblique gripping edge, which edge extends transversely with respect to said wedges, said inclined faces on the side edges of said wedge plate and on said projecting wedges being disposed between the opposite faces of said wedge plate and the faces of said wedges respectively, whereby said plate and said wedges form unobstructed entering parts for said device.

2. A wedge device of the character described, comprising a wedge plate having oppositely inclined flat faces and inclined side edges each formed with a tooth having an inclined top face and a biting edge, and outwardly projecting wedges extending from the opposite faces of said wedge plate, each projecting wedge having oppositely inclined flat faces and an inclined edge provided with wedge teeth each tooth having an inclined top face and an oblique biting edge.

TITUS S. HOSE.